United States Patent [19]
Riedlin, Jr.

[11] Patent Number: 6,125,014
[45] Date of Patent: *Sep. 26, 2000

[54] VIA-LESS CONNECTION USING INTERCONNECT TRACES BETWEEN BOND PADS AND A TRANSDUCER COIL OF A MAGNETIC HEAD SLIDER

[75] Inventor: Vernon M. Riedlin, Jr., San Jose, Calif.

[73] Assignee: Read-Rite Corporation, Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/105,598

[22] Filed: Jun. 26, 1998

[51] Int. Cl.$^7$ .................................................. G11B 21/20
[52] U.S. Cl. ............................................... 360/234.5
[58] Field of Search .................................. 360/103, 234.5

[56] References Cited

U.S. PATENT DOCUMENTS 5,590,005  12/1996  Tachibana ................................ 360/103
5,721,651   2/1998  Kitahara .................................. 360/103
5,781,377   7/1998  Koka et al. .............................. 360/103
5,786,962   7/1998  Kawazoe .................................. 360/104
5,796,549   8/1998  Sedbrook et al. ....................... 360/103
5,894,380   4/1999  Sasada et al. ........................... 360/103
5,896,248   4/1999  Hanrahan et al. ....................... 360/104

*Primary Examiner*—David Davis
*Attorney, Agent, or Firm*—Nathan N. Kallman

[57] ABSTRACT

A planar air bearing slider assembly has an air bearing surface (ABS), a top surface opposite the ABS, and a trailing end. A thin film magnetic transducer is formed on the slider. The transducer has first and second spaced magnetic pole layers that define a magnetic yoke region. A coil structure having first and second ends is disposed between the pole layers for conducting data signals. First and second copper traces are routed from the first and second ends to the trailing end of the planar slider. First and second gold foil bonding pads located on the trailing end of the slider are attached to the copper traces with silver epoxy to provide an external connection to the coil.

10 Claims, 2 Drawing Sheets

VIA-LESS CONNECTION USING INTERCONNECT TRACES BETWEEN BOND PADS AND A TRANSDUCER COIL OF A MAGNETIC HEAD SLIDER

FIELD OF THE INVENTION

This invention relates to thin film magnetic head slider assemblies and in particular to the making of electrical connections between a conductive trace flexure and a transducer supported by an air bearing slider.

DESCRIPTION OF THE PRIOR ART

Disk drives typically include a stack of spaced apart, concentric magnetic storage disks mounted on a common shaft, and an actuator arm assembly encased within a housing. The actuator arm assembly comprises one or more arms extending into spaces between the disks. Mounted on the distal end of an arm is a resilient suspension assembly which carries an air bearing slider. Included in the suspension assembly is a load beam, which is mounted at one end to the actuator arm by means of a base plate and a flexure which is attached to the other end of the load beam. The flexure supports the slider on a gimbal.

In some types of thin film magnetic heads, the thin film transducer is fabricated toward a trailing end of the slider. The coil in a planar thin film transducer generally is formed on a plane of the slider that is substantially parallel to a magnetic storage disk during disk drive operation. There may be a single planar coil, or a coil assembly in two parallel planes, made with continuous turns or windings. In the prior art, bonding pads are formed on a top surface of the slider, which surface is opposite to an air bearing surface, to provide an electrical connection to external read/write circuitry. Ends of the coil are brought out to the top surface of the slider by vertical vias that terminate in the bonding pads on the top surface of the slider. The coil structure lies between two magnetic pole layers designated as P1 and P2 and is insulated from the magnetic layers, P1 and P2, which are typically made of Permalloy. The pole layers form a magnetic yoke around the insulated coil. The air bearing slider is the substrate on which the thin film transducer is deposited at the trailing end of the slider. In production, a ceramic wafer, such as aluminum oxide/titanium carbide, has a multiplicity of thin film heads deposited thereon. Subsequently rails are formed to provide an air bearing surface and the wafer is sliced into a number of slider units.

Conventionally, the ends of the coil are brought to the top surface of the slider using vertical vias that are connected by traces to bond pads on the top surface of the slider so that a wire harness or flexure that connects to read/write circuitry can be connected to the coil. The disadvantage of this type of connection is that it is complex to manufacture and the bond pads on the surface of the slider are subject to breakage.

SUMMARY OF THE INVENTION

An object of this invention is to provide an improved means of attaching a coil to a planar thin film transducer deposited on a surface of an air bearing slider.

In accordance with the present invention, a magnetic yoke of a thin film magnetic transducer comprises a first magnetic pole layer that is deposited on a surface of a substrate in a first plane. A conductive material, such as copper or gold, is plated to form a coil structure disposed in a second plane above the first pole layer. The coil structure, which is encompassed by insulation, has first and second legs extending beyond the magnetic yoke region in the second plane towards a trailing end of the substrate. The first and second legs of the coil structure are substantially planar and provide, respectively, first and second exposed ends of the coil adjacent to the slider trailing end. A second magnetic pole layer is deposited in a third plane above the insulated coil structure. Bonding pads are formed at the trailing end of the slider and are attached to the exposed ends of the coil by means of plated interconnect traces.

BRIEF DESCRIPTION OF THE DRAWINGS

The invention will be described in greater detail with reference to the drawings in which.

Similar numerals refer to similar elements in the drawings. It should be understood that the sizes of the different components in the Figures may not be to scale, or in exact proportion, and are shown for visual clarity and for the purpose of explanation.

DETAILED DESCRIPTION OF THE INVENTION

Figure 1:
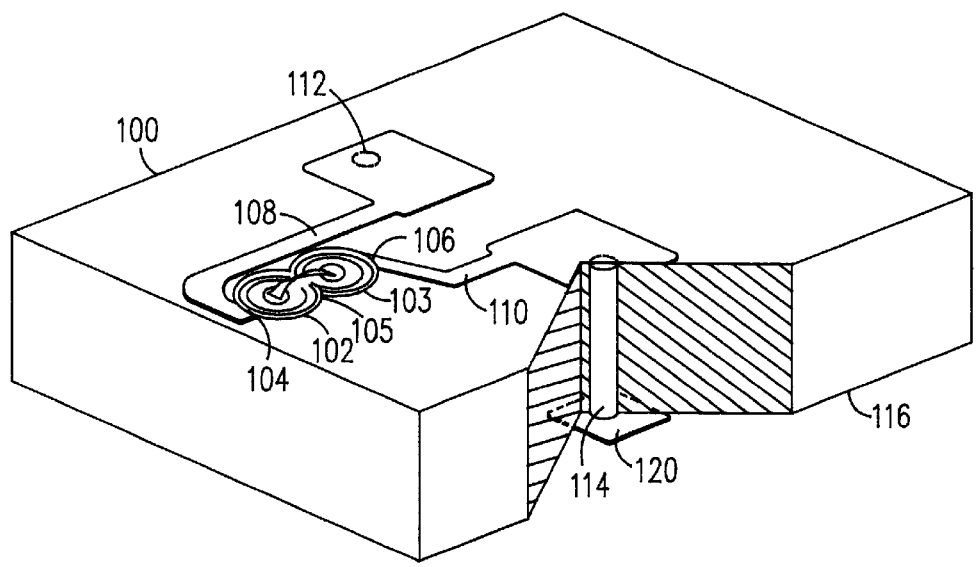
FIG. 1 is an isometric view of a prior art slider, partly broken away, in which planar interconnect traces are connected to bond pads by vias.

FIG. 1 illustrates a prior art air bearing slider 100 formed from a nonmagnetic ceramic substrate having a leading end 118 and a trailing end 119. The slider has an air bearing surface (ABS) extending between said ends (not shown in FIG. 1) that flies closely adjacent to the surface of a magnetic recording disk. A thin film magnetic transducer is formed on a surface of the slider. The transducer comprises a first pole layer P1, a second pole layer P2, and a transducing gap between the P1 and P2 pole layers. Conductive coils 102, 103 are disposed between and electrically insulated from the P1 and P2 pole layers. The pole layers form a magnetic yoke 105 around the insulated coils. In this prior art structure, the ends 104, 106 of the coil 102 and 103 respectively are connected to interconnect traces 108, 110 that provide a route in the plane of the coil to a point of contact with vertical metal vias 112, 114. The vias provide a vertical electrical path to the top surface 116 (which is opposite to the air bearing surface) of the slider. Metal is deposited on the surface 116 to provide a bond pad 120 that is electrically connected to the via 114, shown in the cutaway shaded portion of FIG. 1. Similarly, metal is deposited on the surface 116 to provide a bond pad (not shown) that is electrically connected to the via 112. A wire harness (not shown) is soldered to the bond pads thereby connecting external read write circuitry to the coil. The disadvantage of this type of connection is that it is complex to manufacture, the vias tend to protrude, and the bond pads on the surface 116 of the slider are subject to breakage.

Figure 2:
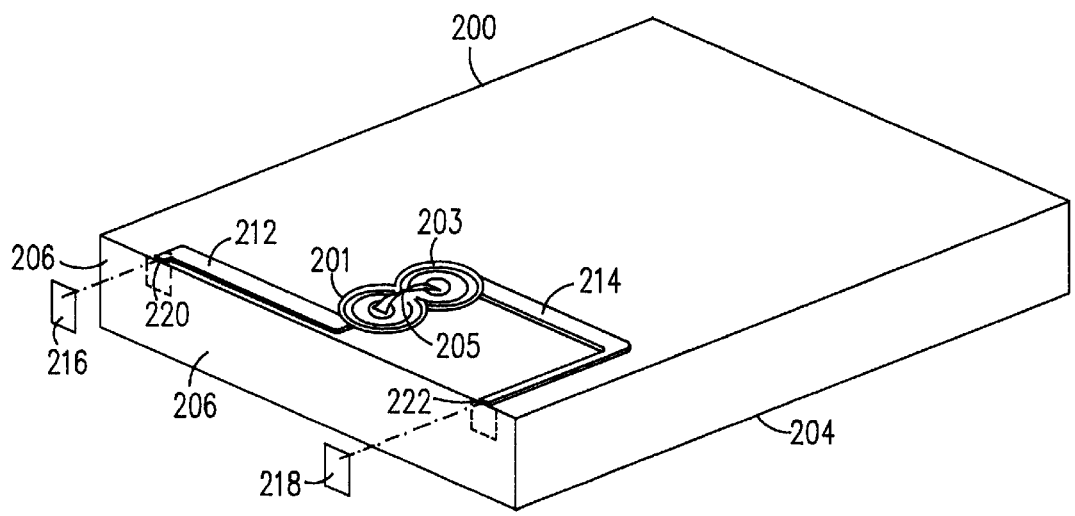
FIG. 2 is an isometric view of a slider in which in the present invention is embodied
Figure 3:
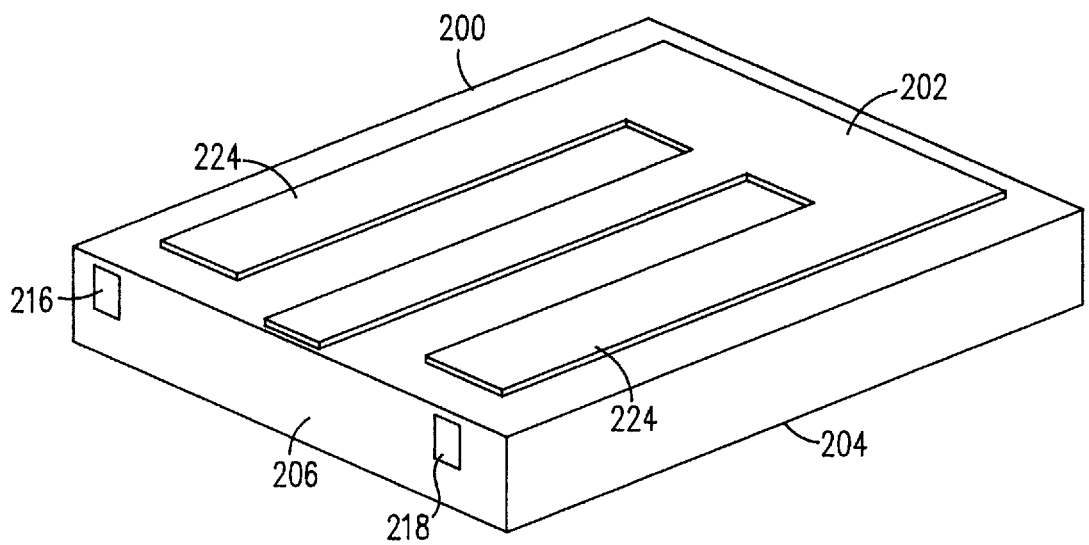
FIG. 3 is an isometric view of the slider of FIG. 2 showing a configured air bearing surface.

In FIGS. 2 and 3, an air bearing slider 200 of an inductive magnetic head, constructed in accordance with this invention, has an air bearing surface 202 that is shown in FIG. 3. For clarity the configured rails of the air bearing surface (ABS) are not shown in FIG. 2. The slider is shown top side down, the top surface 204 being opposite to the ABS. The slider has a trailing end 206 joining the ABS and the opposite surface 204. First and second spaced magnetic pole layers define a magnetic yoke region 205. Coil structure 201, 203 is disposed in a plane between the pole layers and insulated therefrom. First and second copper traces 212, 214 are deposited to provide a route from the coil structure to the trailing end 206 of the slider. First and second gold foil bond pads 216, 218, are attached to the ends 220, 222 of the copper traces, with silver epoxy for example. As shown in FIG. 3, the ABS 202 may be formed on a diamond-like carbon (DLC) layer that is deposited above the transducer and interconnect traces and configured with etched rails 224.

The slider, with gold pads 216, 218 attached, is shown in FIG. 3. The electrical connection between the transducer and the read/write driver electronics may be made by twisted wires which run the length of the suspension load beam and extend over the flexure and slider. In this case, the ends of the wires can be soldered or ultrasonically bonded to the gold pads 216 and 218 on the slider. Alternatively, a flexure with embedded wires and bonding pads can be used. In this case, the conductive traces terminate in conductive pads at a forward section of the flexure for connection to the corresponding gold pads 216 and 218 on the slider. The connections can be made by known techniques such as stitch bonding or ultrasonic welding.

Figure 4:
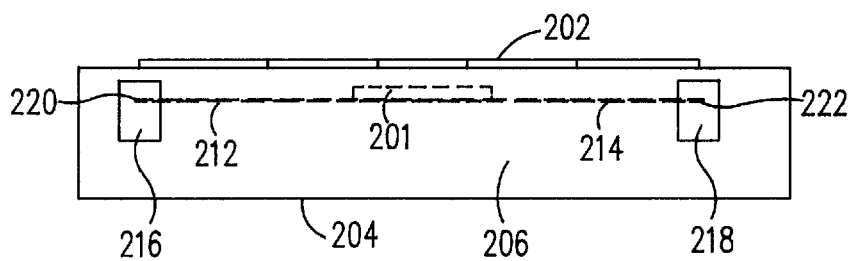
FIG. 4 is a view of the trailing end of the slider shown in FIG. 2.

FIG. 4 is a view of the trailing end 206 of the slider shown in FIG. 2. The coil structure 201, 203, copper traces 212, 214, and the ends thereof, 220, 222, are shown by broken lines as the structure is embedded in the slider 200. In a preferred embodiment, the bond pads 216, 218, measure about 0.004 inch×0.006 inch and are spaced 0.002 inch from the sides of the slider and 0.0015 inch from the ABS surface 202. When completed, the slider height is about 0.012 inch.

Method of Manufacture

Any known method of forming a coil structure in a magnetic transducer may be used to form the coil structure described herein. A method of manufacturing a thin film magnetic transducer in which a layer of photoresist material is used to pattern the turns of a bi-level electrical coil is described in U.S. Pat. No. 5,472,736 "Method of making a bi-level coil for a thin film magnetic transducer" issued Dec. 5, 1995 to Barr et al. In U.S. Pat. No. 5,173,826 "Thin film head with coils of varying thickness" issued Dec. 22, 1992 to Peter G. Bischoff, a thin film head assembly includes a coil structure having a thin coil layer that extends within and beyond the magnetic yoke area delineated between opposing magnetic pole layers, and an additional coil layer formed as a step segment adjacent to the thin layer. The additional layer is spaced away from the pole layers and the magnetic yoke area and provides a thickened coil area which affords a significant reduction in coil resistance.

In the present invention, a suitable substrate is first prepared. Then, a first magnetic pole layer defining a first pole of magnetic yoke region 205 is deposited on the substrate in a first plane of the transducer. Next a conductive material is plated in a pattern to form coil structure 201, 203 disposed in a second plane above the first plane. The coil structure has first and second traces 212, 214, extending in the second plane to a trailing end 206 of the substrate. The first and second traces of the coil structure are substantially planar and extend beyond the magnetic yoke region 205 to the trailing end 206 of the substrate. The first and second traces provide, respectively, first and second exposed ends 220, 222, of the coil at the trailing end 206. A second magnetic pole layer is deposited over a suitable insulating layer defining a second pole of the magnetic yoke region 205 in a third plane above the coil structure. First and second bonding pads 216, 218, made of gold foil, for example, are attached, respectively, to the first and second exposed ends 220, 222 of the coil traces 212, 214 at the trailing end 206 with a metal adhesive, such as silver epoxy. Rails 224 are configured by etching a DLC layer 230 of about 120 microinches up to 100 microinches above the transducer and interconnect traces.

By virtue of this invention, lower manufacturing cost is realized and bond pad breakage is reduced.

It should be understood that the invention is not limited to the specific parameters, materials and embodiments described above. Various modifications and variations may be made within the scope of the present invention.

What is claimed is:

1. An air bearing slider for supporting a planar thin film transducer comprising:

a substrate having an air bearing surface, an opposing top surface, a leading end and a trailing end;

a magnetic yoke including first and second magnetic pole layers formed over said air bearing surface;

a coil structure formed over said air bearing surface between said first and second pole layers, said coil structure being electrically insulated from said first and second magnetic pole layers;

first and second traces that are substantially planar, said traces extending along said air bearing surface to said trailing end of said substrate beyond said magnetic yoke, said first and second traces having respectively first and second exposed ends at said trailing end; and first and second rectangular bonding pads formed on said trailing end and attached respectively to said first and second exposed ends of said first and second traces, each of said bonding pads having a top side contiguous with said air bearing surface, said exposed ends of said traces making electrical contact with each of said top sides of said bonding pads at the air bearing surface;

wherein said trailing end is formed without any magnetic yoke or magnetic transducer and without conductive leads; and wherein no vias are formed within said slider.

2. The magnetic head assembly of claim 1 wherein said first and second traces are formed of copper.

3. The magnetic head assembly of claim 1 wherein said first and second bonding pads are attached to said first and second traces with a metal adhesive.

4. The magnetic head assembly of claim 3 wherein said first and second bonding pads are formed of gold foil.

5. The magnetic head assembly of claim 3 wherein said metal adhesive is silver epoxy.

6. A thin film head assembly planar slider comprising:

a substrate having an air bearing surface, an opposing top surface, a leading end and a trailing end;

a magnetic yoke formed over said air bearing surface;

a coil structure formed over said air bearing surface and disposed within said magnetic yoke and extending therefrom and having a first end and a second end;

first and second metal traces routed respectively from said first end and said second end of said coil structure to said trailing end of said substrate; and first and second rectangular bonding pads formed on said trailing end and attached to said metal traces with a metal adhesive, each of said bonding pads having a top side contiguous with said air bearing surface, said traces making electrical contact with each of said top sides of said bonding pads at the air bearing surface;

wherein said trailing end is formed without any magnetic yoke or magnetic transducer and without conductive leads, and wherein no vias are formed within said slider.

7. The magnetic head assembly of claim 6 wherein said metal traces are formed of copper.

8. The magnetic head assembly of claim 6 wherein said bonding pads are formed of gold foil.

9. The magnetic head assembly of claim 6 wherein said bonding pads are attached to said metal traces with a metal adhesive.

10. The magnetic head assembly of claim 9 wherein said metal adhesive is silver epoxy.

* * * * *